United States Patent
Balmakhtar et al.

(10) Patent No.: US 10,172,063 B1
(45) Date of Patent: Jan. 1, 2019

(54) INTELLIGENT BACKHAUL IN A WIRELESS COMMUNICATION NETWORK

(71) Applicant: Sprint Communications Company L.P., Overland Park, KS (US)

(72) Inventors: Marouane Balmakhtar, Alexandria, VA (US); Aaron Paul Hinkle, Centreville, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 2 days.

(21) Appl. No.: 15/386,283

(22) Filed: Dec. 21, 2016

(51) Int. Cl.
  *G01R 31/08* (2006.01)
  *H04W 36/22* (2009.01)
  *H04W 36/00* (2009.01)

(52) U.S. Cl.
  CPC ........ *H04W 36/22* (2013.01); *H04W 36/0011* (2013.01)

(58) Field of Classification Search
  CPC .................................................... H04W 36/22
  See application file for complete search history.

(56) References Cited

U.S. PATENT DOCUMENTS

| | | | |
|---|---|---|---|
| 8,428,610 B2 | 4/2013 | Chowdhury et al. | |
| 8,953,444 B2 | 2/2015 | Ghosh et al. | |
| 9,060,289 B2 | 6/2015 | Chandrasekhar et al. | |
| 9,307,446 B2* | 4/2016 | Choi | H04L 5/00 |
| 9,451,591 B2 | 9/2016 | Cucala Garcia | |
| 9,860,788 B2* | 1/2018 | Cui | H04W 28/08 |
| 2012/0295626 A1* | 11/2012 | Kitaji | H04B 7/155 |
| | | | 455/438 |
| 2013/0143566 A1* | 6/2013 | Kubota | H04W 36/30 |
| | | | 455/436 |
| 2013/0225174 A1 | 8/2013 | Hunukumbure | |
| 2014/0187243 A1* | 7/2014 | Rune | H04W 36/26 |
| | | | 455/436 |
| 2015/0257024 A1 | 9/2015 | Baid et al. | |
| 2016/0192239 A1 | 6/2016 | Salvador et al. | |
| 2016/0337937 A1* | 11/2016 | McCann | H04L 45/64 |
| 2017/0019811 A1* | 1/2017 | Parulkar | H04W 72/12 |

FOREIGN PATENT DOCUMENTS

WO  2014079860  5/2014

* cited by examiner

*Primary Examiner* — Gerald A Smarth (57) ABSTRACT

A wireless network backhaul node serves eNodeBs. The backhaul node exchanges user data and network signaling between the eNodeBs and a Long Term Evolution (LTE) core. The backhaul node receives loading information from the eNodeBs and determines overloaded eNodeBs and underloaded eNodeBs. The backhaul node selects handover thresholds for the eNodeBs to inhibit handovers from the underloaded eNodeBs to the overloaded eNodeBs and to encourage handovers from the overloaded eNodeBs to the underloaded eNodeBs. The backhaul node transfers the selected handover thresholds to the eNodeBs. The backhaul node also performs X2 and/or S1 handover assistance for the eNodeBs.

18 Claims, 11 Drawing Sheets

INTELLIGENT BACKHAUL IN A WIRELESS COMMUNICATION NETWORK

TECHNICAL BACKGROUND

Wireless communication networks exchange data for User Equipment (UE) to provide various user data services. The UEs may be phones, computers, machines, and the like. The user data services could be media streaming, audio/video conferencing, data messaging, internet access, or some other information service. Long Term Evolution (LTE) is a popular type of wireless communication network.

LTE networks include evolved Node Bs (eNodeBs) that wirelessly communicate with the UEs. The eNodeBs communicate with each other and with an LTE core network over backhaul links. The LTE core network includes a Mobility Management Entity (MME), Serving Gateway (S-GW), and other network elements. The backhaul links comprise switches, routers, and media. The switches may use various Layer 2 protocols like Ethernet. The routers may use various Layer 3 protocols like Internet Protocol (IP). The media may use metal, glass, air, space, or some other material.

Figure 1:
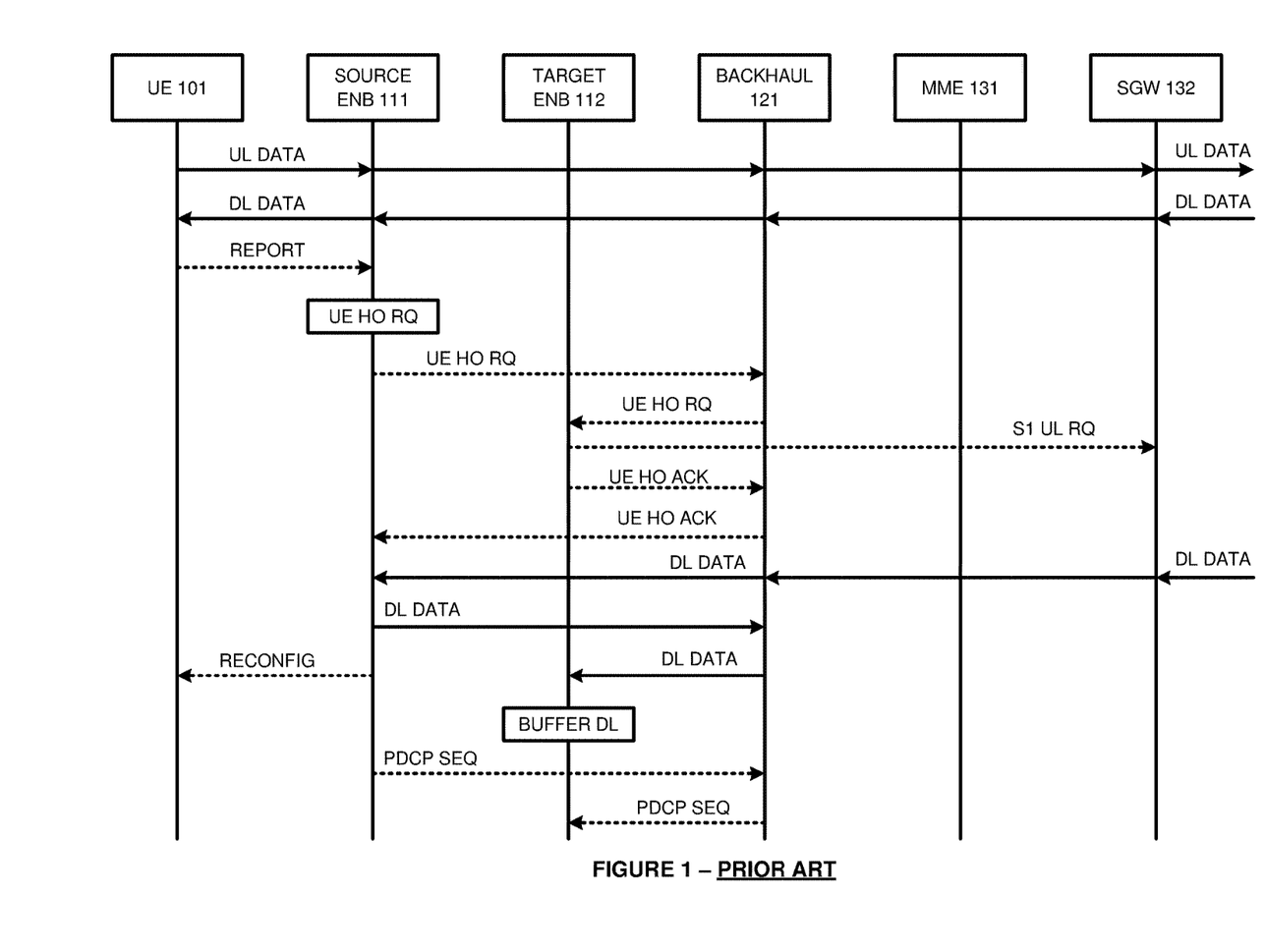
FIGS. 1-4 illustrate the operation of a PRIOR ART network to perform X2 and S1 handovers from a source eNodeB to a target eNodeB.
Figure 2:
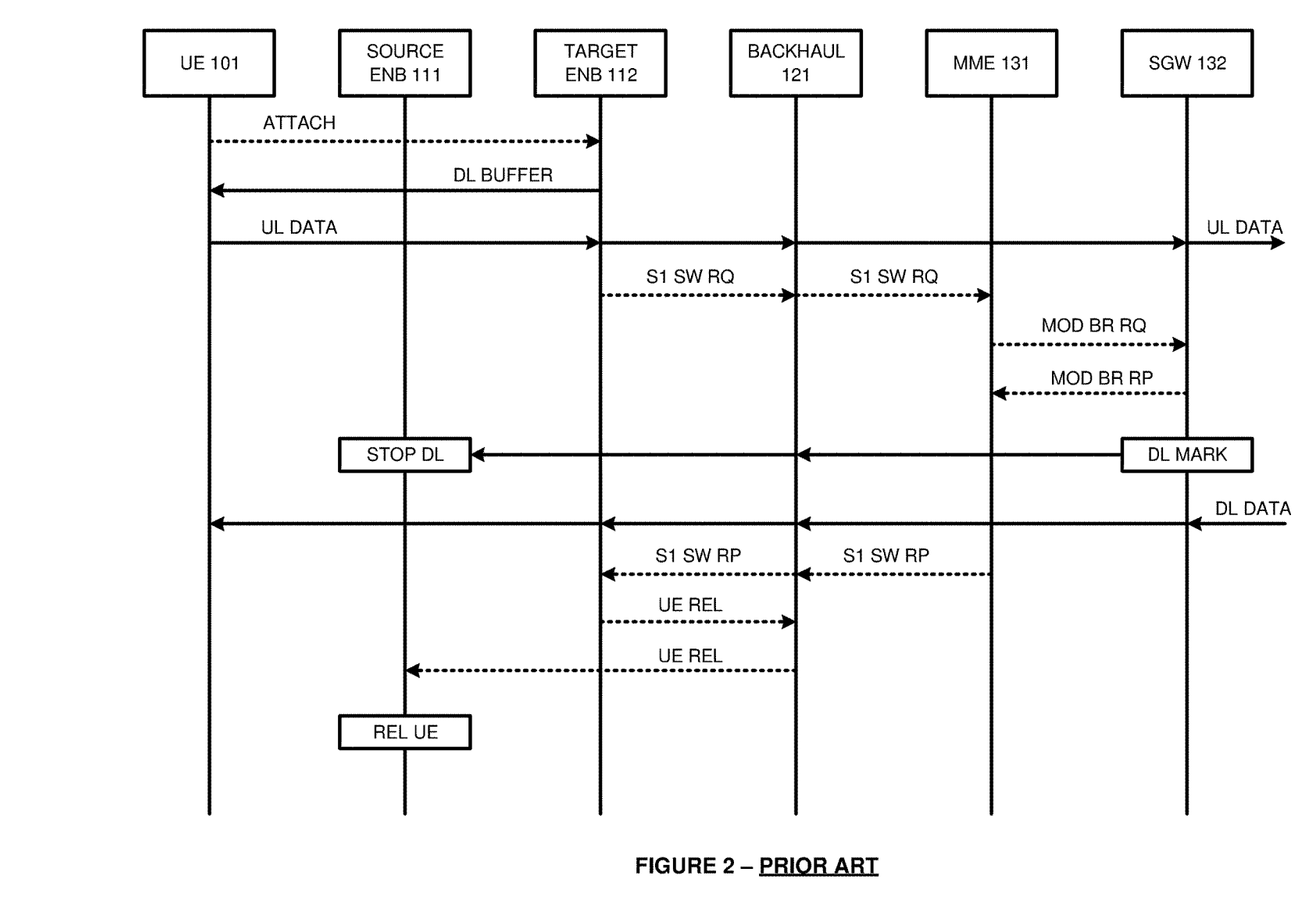

FIGS. 1-2 illustrate the operation of a prior art LTE network to perform an X2 UE handover. Initially, UE 101 is attached to source eNodeB (ENB) 111. Uplink (UL) data between UE 101 and SGW 132 traverses source eNodeB 111 and backhaul 121. Likewise, Downlink (DL) data between UE 101 and SGW 132 traverses source eNodeB 111 and backhaul 121.

Source eNode B 111 receives measurement reports from UE 101 indicating signal strength for source eNodeB 111 and neighbor eNodeBs that include target eNodeB 112. Source eNode B 111 determines when UE 101 has better signal strength from a neighbor eNodeB. In this example, target eNodeB 112 provides better signal strength at UE 101 than source eNodeB 111, so in source eNodeB 111, an X2 handover is triggered for UE 101 to target eNodeB 112.

Source eNodeB 111 transfers an X2 handover request (RQ) over backhaul 121 to target eNodeB 112. The X2 handover request indicates UE bearer context and other information. Target eNodeB 112 establishes an UL to SGW 132 and generates UE attachment data. Target eNodeB 112 transfers an X2 handover response (RP) over backhaul 121 to source eNodeB 111. The X2 handover response indicates the UE bearer context, X2 tunnel data, UE attachment data, and other information.

Source eNodeB 111 now forwards the DL data (from backhaul 121 and SGW 132) to target eNodeB 112 over the X2 tunnel through backhaul 121. Target eNodeB 112 buffers the DL data. Source eNodeB 111 also transfers a reconfiguration request to UE 101 that indicates the UE attachment data for target eNodeB 112. In addition, source eNodeB 111 transfers sequence numbers to target eNodeB 112 over backhaul 121 that indicate the handover point in the DL data flow.

Referring to FIG. 2, UE 101 attaches to target eNodeB 112 using the UE attachment data. Target eNodeB 112 transfers the buffered DL data to UE 101. The UL between UE 101 and SGW 132 still traverses target eNodeB 112 and backhaul 121. Target eNodeB 112 transfers an S1 switch request to MME 131 over backhaul 121. The S1 switch request indicates the UE bearer, target eNodeB tunnel data, and other information. MME 131 transfers a modify bearer request to SGW 132, and SGW 132 returns a modify bearer response to MME 132 (interactions with the Packet Data Network Gateway are omitted here for clarity).

S-GW 132 marks the handover point in the DL data flow to source eNodeB 111. Source eNodeB 111 stops forwarding data over the X2 tunnel at the handover marker. The DL data between SGW 132 and UE 101 now traverses backhaul 121 and target eNodeB 112. MME 131 transfers an S1 switch response to target eNodeB 111 over backhaul 121. Target eNodeB 111 transfers a UE context release (REL) to source eNodeB 111 over backhaul 121. Source eNodeB 111 clears UE 101 context and the handover is complete.

Figure 3:
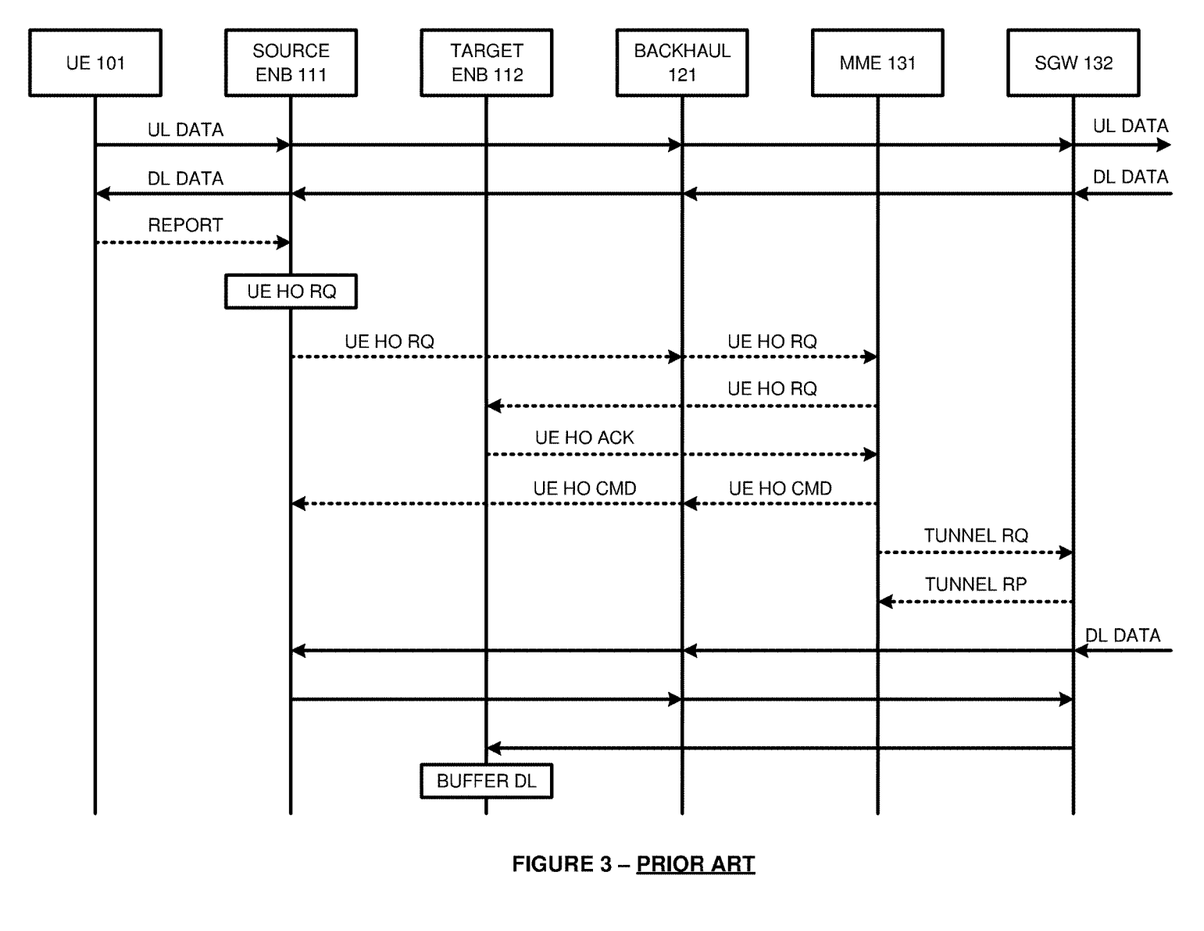
Figure 4:
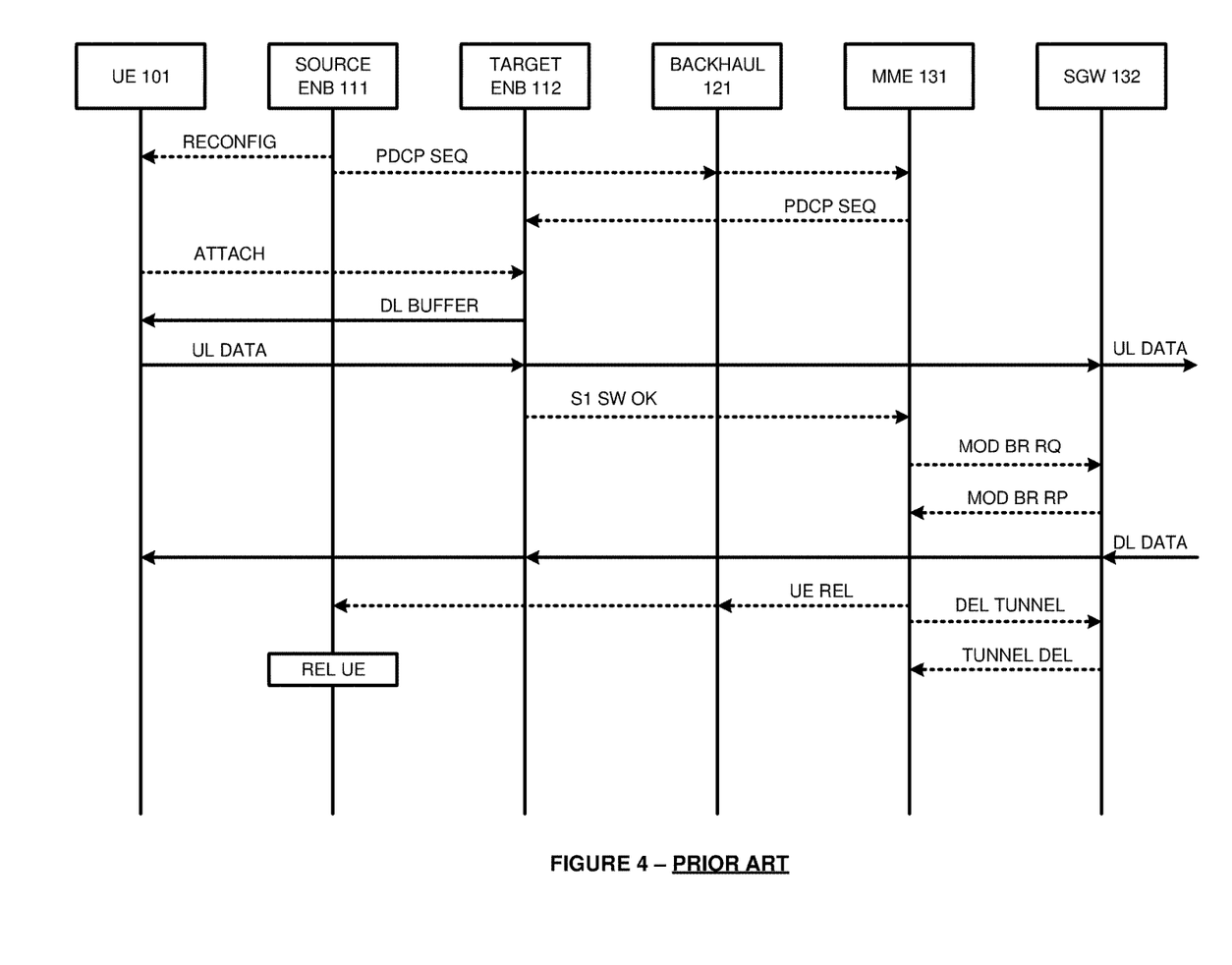

FIGS. 3-4 illustrate the operation of the prior art LTE network to perform an S1 UE handover. The S1 handover is typically used when an X2 handover is not available or fails. Initially, UL data between UE 101 and SGW 132 traverses source eNodeB 111 and backhaul 121. Likewise, Downlink (DL) data between UE 101 and SGW 132 traverses source eNodeB 111 and backhaul 121.

Source eNode B 111 receives measurement reports from UE 101 indicating signal strength for source eNodeB 111 and neighbor eNodeBs that include target eNodeB 112. Source eNode B 111 determines when UE 101 has better signal strength from a neighbor eNodeB. In this example, target eNodeB 112 provides better signal strength at UE 101 than source eNodeB 111, so in source eNodeB 111, an S1 handover is triggered for UE 101 to target eNodeB 112.

Source eNodeB 111 transfers an S1 handover request (RQ) over backhaul 121 to MME 131. The S1 handover request indicates target eNodeB 112, source eNodeB tunnel data, and other information. MME 131 transfers the S1 handover request to target eNodeB 112. Target eNodeB 112 returns an acknowledgement to MME 131. The acknowledgement indicates UE attachment data and target eNodeB tunnel data. MME 131 transfers an S1 handover command (CMD) to source eNodeB 111 over backhaul 121 that indicates the UE attachment data.

MME 131 transfer an indirect tunnel request to SGW 132, and SGW returns an indirect tunnel response. The tunnel request indicates source and target eNodeB tunnels to connect. The DL data between SGW 132 and UE 101 now traverses backhaul 121 to source eNodeB 111 and then to backhaul 121 over the indirect tunnel through SGW 132 to target eNodeB 112. Target eNodeB 112 buffers the DL data.

Referring to FIG. 4, source eNodeB 111 transfers a reconfiguration request to UE 101 that indicates the UE attachment data for target eNodeB 112. In addition, source eNodeB 111 transfers sequence numbers to target eNodeB 112 over backhaul 121 and MME 131 that indicate the handover point in the DL data flow. UE 101 attaches to target eNodeB 112 using the UE attachment data. Target eNodeB 112 transfers the buffered DL data to UE 101. The UL data between UE 101 and SGW 132 now traverses target eNodeB 112.

Target eNodeB 112 transfers an S1 switch Notice (OK) to MME 131. The S1 switch request indicates the UE bearer and other information. MME 131 transfers a modify bearer request to SGW 132 and SGW 132 returns a modify bearer response to MME 132 (interactions with the Packet Data Network Gateway are omitted here for clarity). S-GW 132 modifies the DL bearer. The DL data between SGW 132 and UE 101 now traverses target eNodeB 112. MME 131 transfers a UE context release to source eNodeB 111 over backhaul 121. Source eNodeB 111 clears UE 101 context. MME 131 transfers an indirect tunnel delete (DEL) request to SGW 132. SGW 132 deletes the indirect tunnel and the handover is complete.

The prior art LTE network uses backhaul 121. Unfortunately, backhaul 121 does not intelligently assist the eNodeBs with load balancing. Backhaul 121 does not intelligently assist eNodeBs with handover operations.

TECHNICAL OVERVIEW

A wireless network backhaul node serves eNodeBs. The backhaul node exchanges user data and network signaling between the eNodeBs and a Long Term Evolution (LTE) core. The backhaul node receives loading information from the eNodeBs and determines overloaded eNodeBs and underloaded eNodeBs. The backhaul node selects handover thresholds for the eNodeBs to inhibit handovers from the underloaded eNodeBs to the overloaded eNodeBs and to encourage handovers from the overloaded eNodeBs to the underloaded eNodeBs. The backhaul node transfers the selected handover thresholds to the eNodeBs. The backhaul node also performs X2 and/or S1 handover assistance for the eNodeBs.

DETAILED DESCRIPTION

Figure 5:
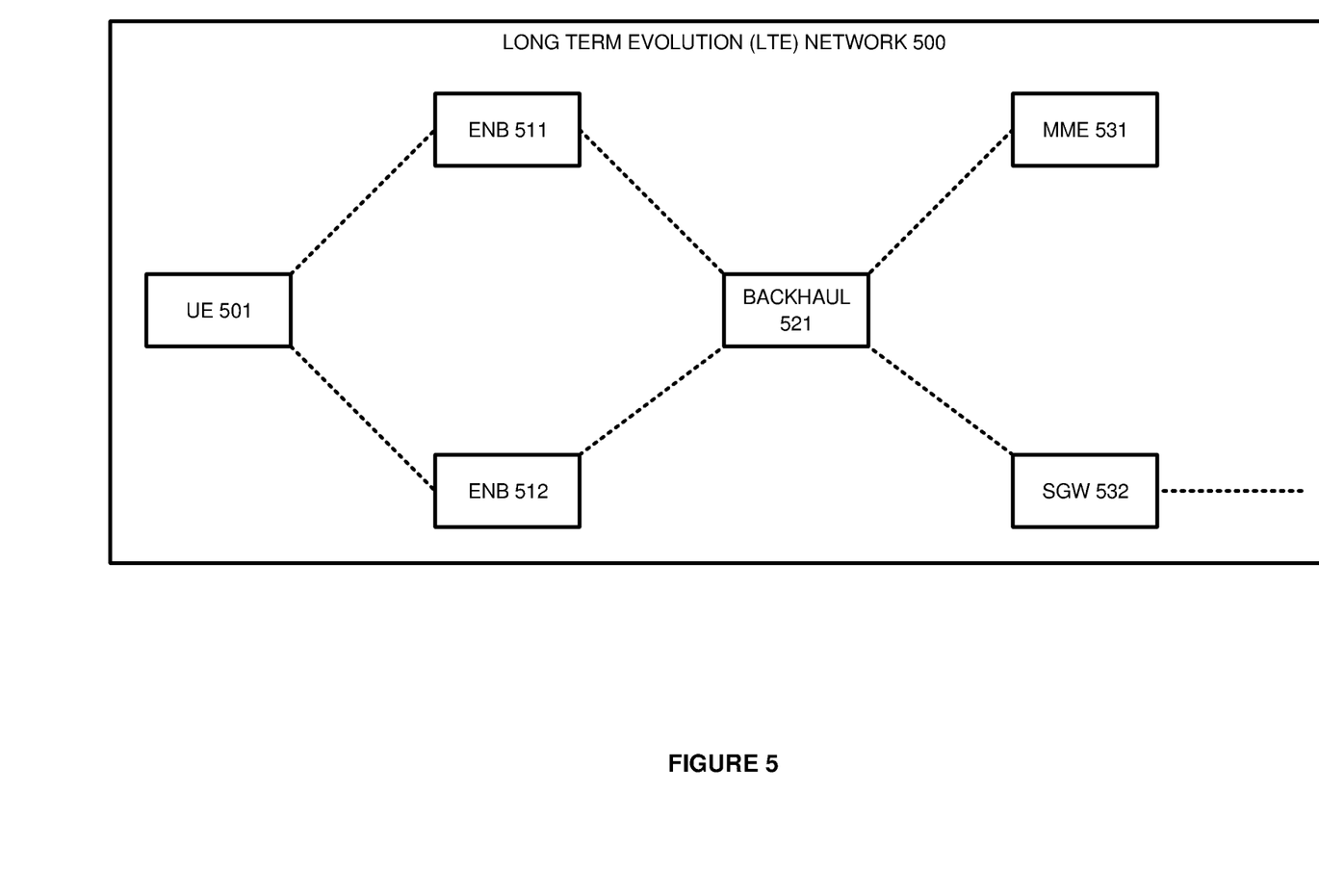
FIGS. 5-6 illustrate a Long Term Evolution (LTE) network with intelligent backhaul to provide load balancing and handover processing to eNodeBs.
Figure 6:
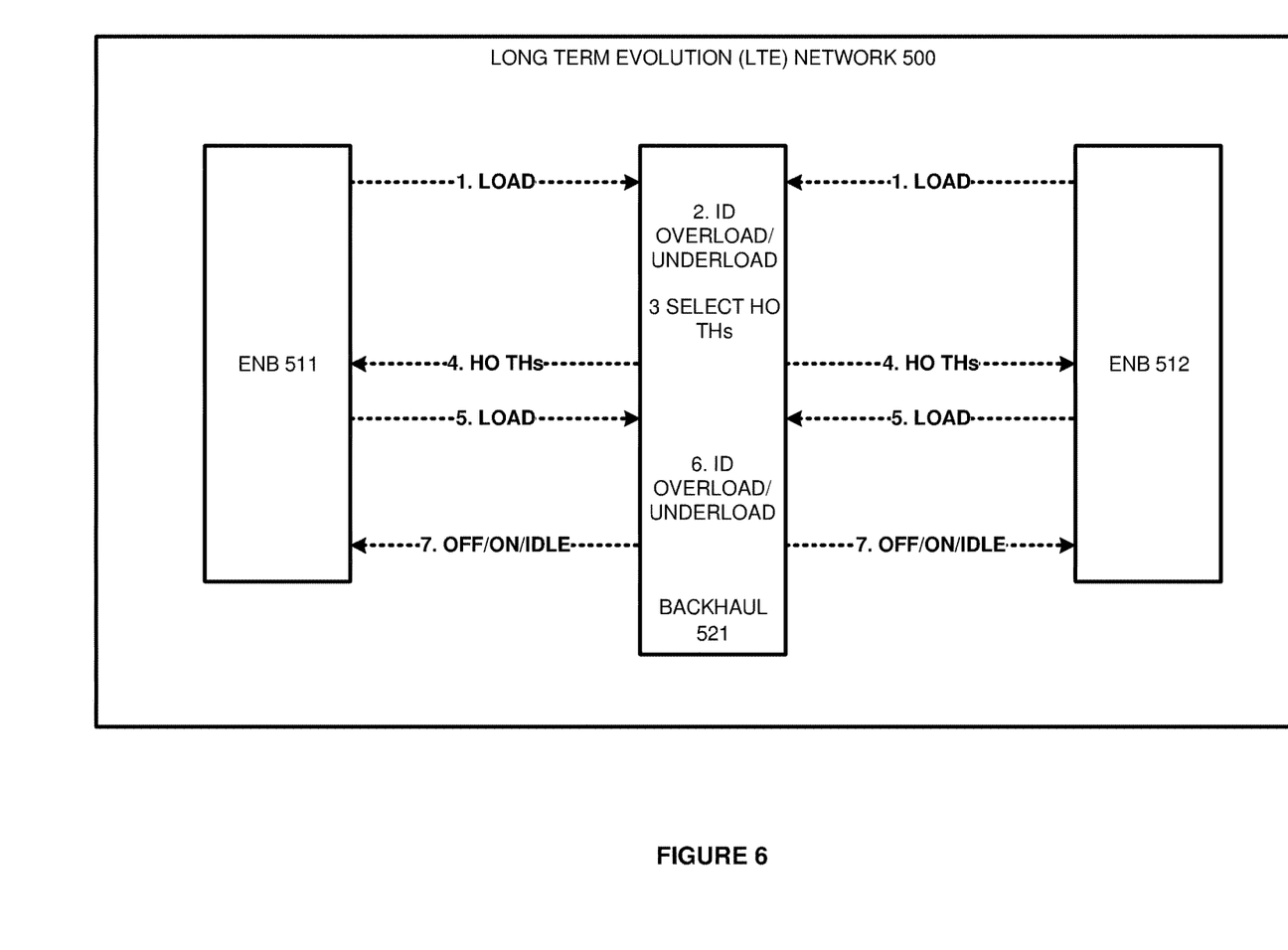

FIGS. 5-6 illustrate Long Term Evolution (LTE) network 500 with intelligent backhaul 521 to provide load balancing and handover processing to eNodeBs. LTE network 500 exchanges data for User Equipment (UE) 501 to provide various user data services. UE 501 may be a phone, computer, machine, and the like. The user data services could be media streaming, audio/video conferencing, data messaging, internet access, or some other information service.

LTE network 500 comprises UE 501, eNodeB 551, eNodeB 512, backhaul 521, Mobility Management Entity (MME) 531, and Serving Gateway (SGW) 532. eNodeBs 511-512 comprise wireless base stations that includes antennas, amplifiers, filters, modulators, baseband computer system, and communication links. MME 531 comprises a computer system. SGW 532 comprises a computer system with user data interfaces. The computer systems comprise components like Input/Output (I/O) transceivers, Central Processing Units (CPUs), Random Access Memory (RAM), persistent data storage, and bus interfaces. The CPUs execute software stored in the RAM and/or the persistent data storage.

Backhaul 521 comprises switches, routers, and media. The switches may use various Layer 2 protocols like Ethernet. The routers may use various Layer 3 protocols like Internet Protocol (IP). The media may use metal, glass, air, space, or some other material. Backhaul 521 further comprises a computer system to offload handover processing from eNodeBs 511-512. The backhaul computer system may be a stand-alone system or be integrated within a layer 2 switch, layer 3 router, or Network Function Virtualization (NFV) computer. For example, the backhaul computer system to offload handover processing from eNodeBs could be implemented through a Virtual Network Function (VNF) that executes in an edge NFV infrastructure.

Referring to FIG. 6, a load balancing operation is described. First, eNodeBs 511-512 transfer their loading information to backhaul 521. The loading could be number of UEs, average/peak data throughput, and the like. Backhaul 521 may passively receive the loading data by inspecting eNodeB messaging to determine UE counts, active data bearers, and other metrics on a per-eNodeB basis. Second, backhaul 521 processes the loading information to identify overloaded eNodeBs and underloaded eNodeBs. The under/overload determination could use per-eNodeB (or eNodeB type) loading thresholds that indicate the underload level and the overload level. Third, backhaul 521 selects handover thresholds (THs) for eNodeBs 511-512. A handover threshold indicates the signal strength difference between a source eNodeB and a target eNodeB that triggers a UE handover from the source to the target. A typical handover threshold is the target eNodeB being three decibels better than the source eNodeB.

To inhibit handovers from a lightly loaded eNodeB to a heavily loaded eNodeB, backhaul 521 selects a high signal strength difference to implement a high handover threshold. For example, a handover threshold higher than three decibels could be used to slow or stop handovers from source eNodeB 511 to target eNodeB 512. To encourage handovers from heavily loaded eNodeBs to lightly loaded eNodeBs, backhaul 521 selects a low signal strength difference to implement a low handover threshold. For example, a handover threshold lower than three decibels (or a negative threshold) could be used to speed or force handovers from source eNodeB 511 to target eNodeB 512. eNodeBs 511-512 apply their handover thresholds to trigger UE handovers. The UE handovers should help load balance the eNodeBs.

Fifth, eNodeBs 511-512 transfer new loading information to backhaul 521. Sixth, backhaul 521 processes the new loading information to identify any still-overloaded eNodeBs or still-underloaded eNodeBs. Seventh, backhaul 521 may turn a still-overloaded eNodeB to off or idle. Backhaul 521 may also turn on a neighbor eNodeB to help an overloaded eNodeB. Backhaul 521 may also turn off a consistently underloaded eNodeB.

For additional support, backhaul 521 may allocate/deallocate network resources to/from the eNodeBs. Backhaul 521 may allocate carrier aggregation resources from underloaded eNodeBs to overloaded eNodeBs. For example, backhaul 521 may restrict the number of secondary carriers for underloaded eNodeBs and increase the number of secondary carriers for overloaded eNodeBs. For NFV systems, backhaul 521 request vertical and/or horizontal scaling for eNodeB VNFs to assist overloaded eNodeBs and reduce resource consumption by underloaded eNodeBs. For example, backhaul 521 may transfer a message to an NFV orchestrator to modify computing resources or software resources for a eNodeB VNF.

Figure 7:
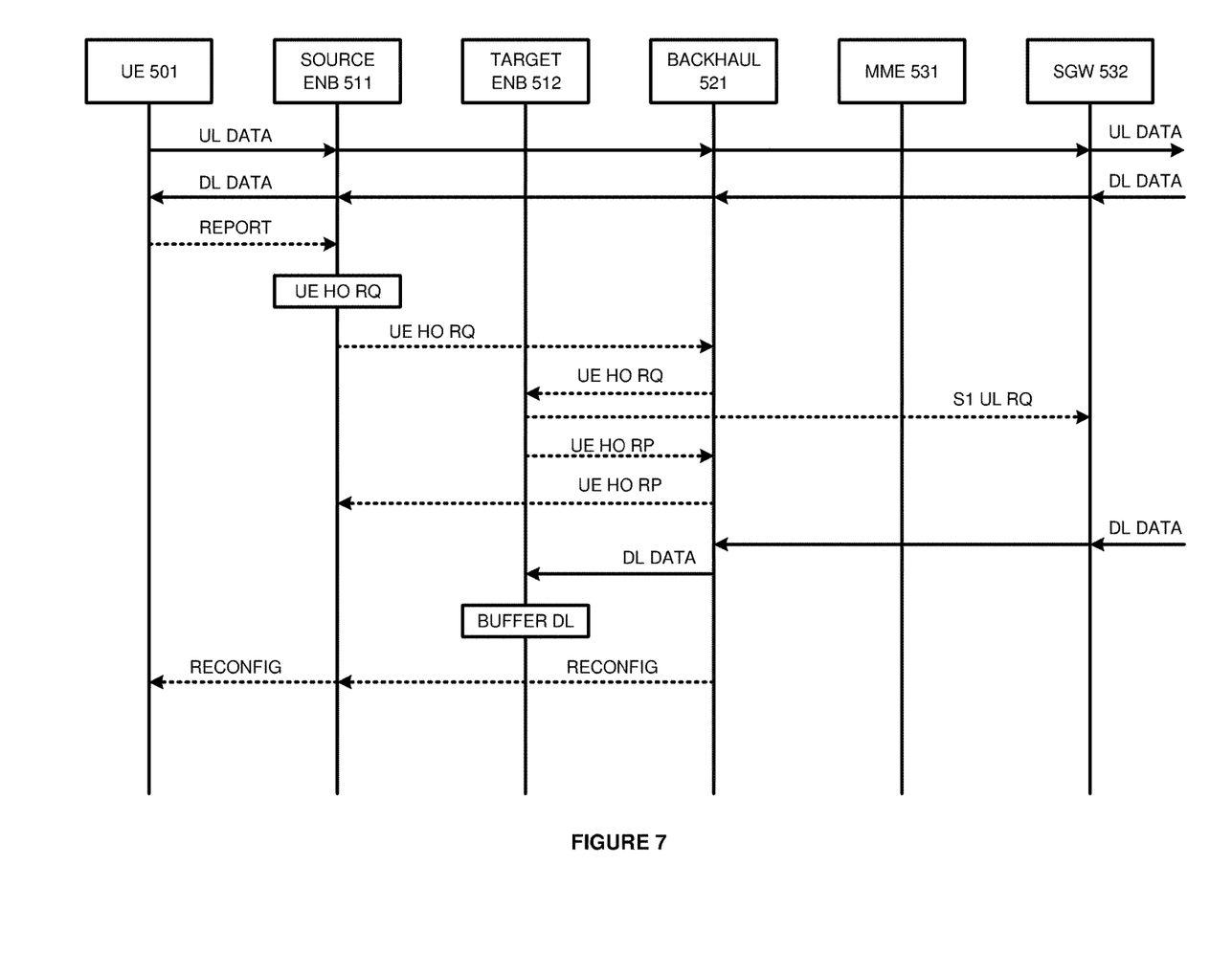
FIGS. 7-8 illustrate the operation of LTE network with intelligent backhaul to offload X2 hand-over processing from the source eNodeB and the target eNodeB.
Figure 8:
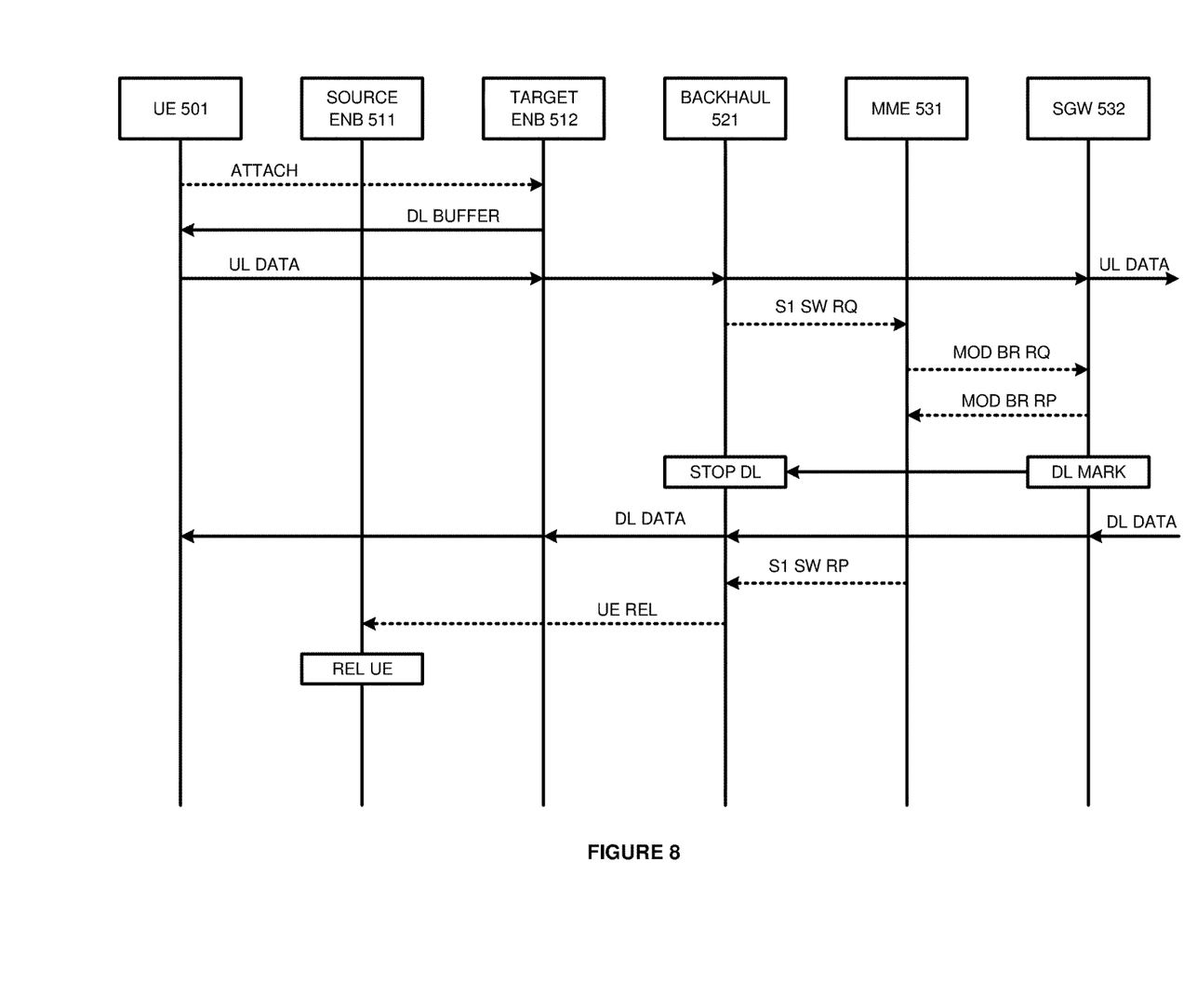
Figure 9:
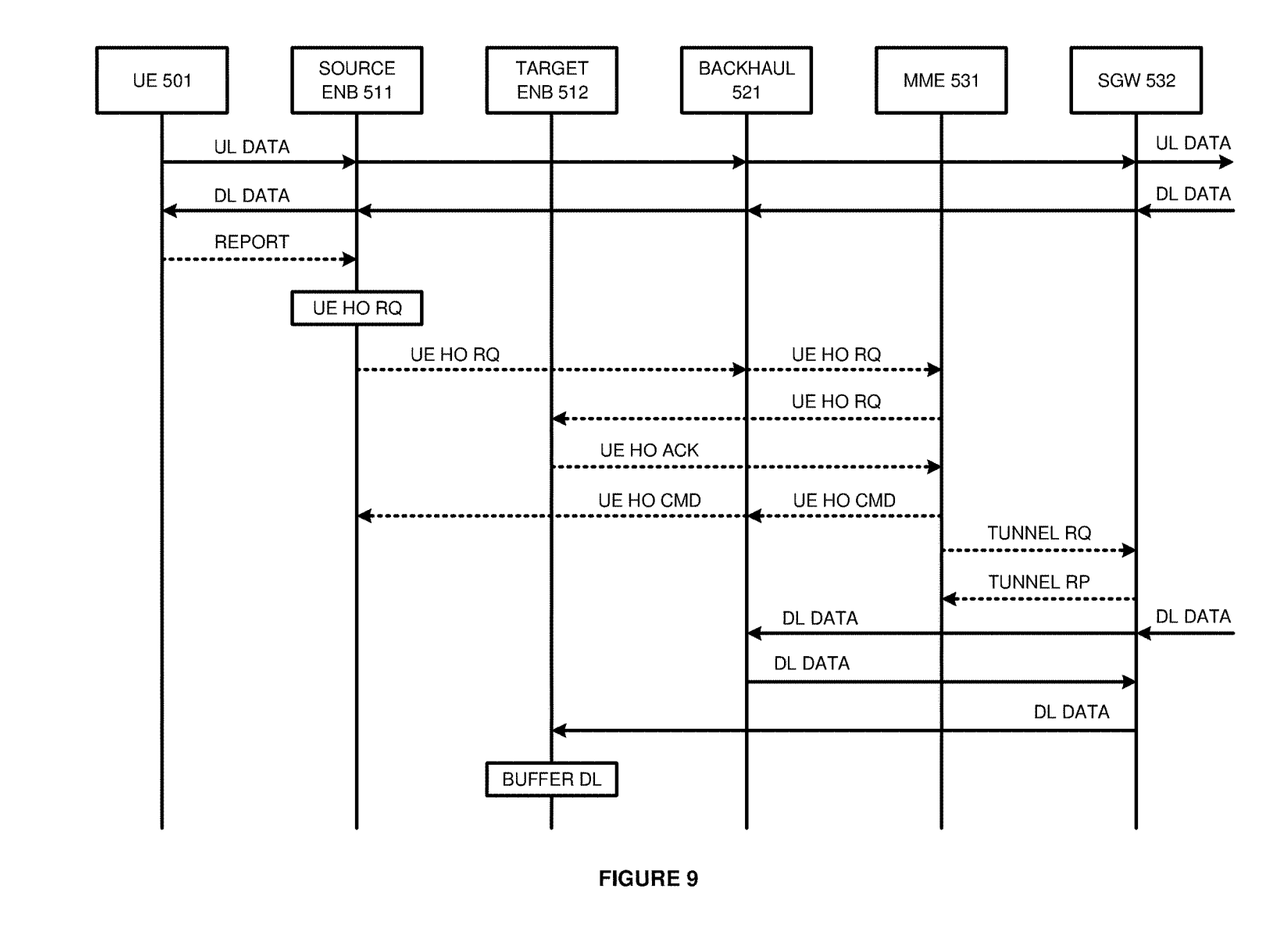
FIGS. 9-10 illustrate the operation of LTE network with intelligent backhaul to offload S1 hand-over processing from the source eNodeB and the target eNodeB.
Figure 10:
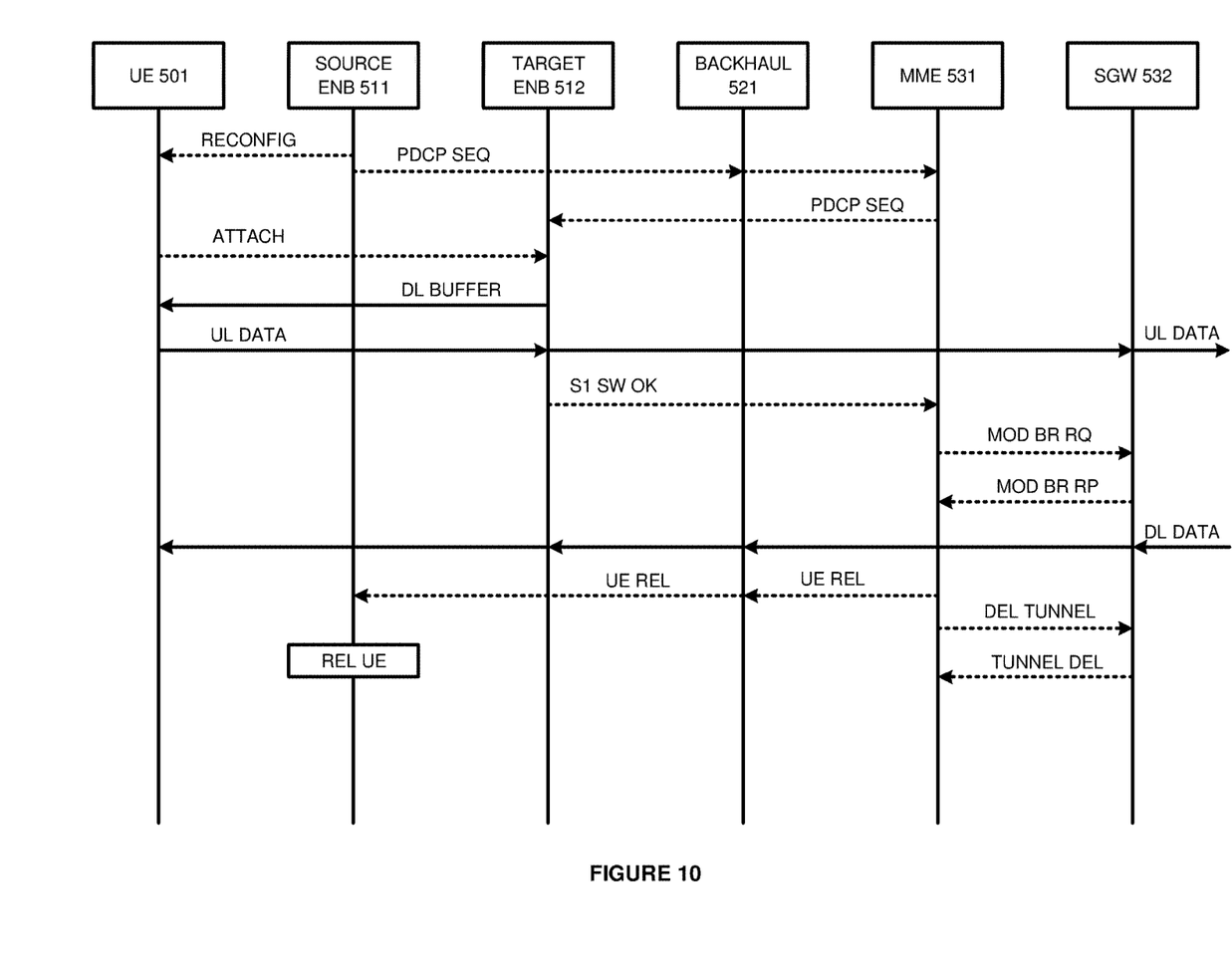

In addition to load balancing, backhaul 521 may assist eNodeBs with UE power control, inter-cell interference, coordinated multipoint communications, physical security, site lighting, and the like. Advantageously, backhaul 521 performs load balancing for eNodeBs through handover threshold control and on/off/idle control. When handovers do occur, backhaul 521 may also perform handover processing for eNodeBs 511-512. FIGS. 7-8 detail an example of X2 handover processing. FIGS. 9-10 detail an example of S1 handover processing.

FIGS. 7-8 illustrate the operation LTE network 500 with intelligent backhaul 521 to offload X2 hand-over processing from source eNodeB 511 and target eNodeB 512. Initially, UE 501 is attached to source eNodeB (ENB) 511. Uplink (UL) data between UE 501 and SGW 532 traverses source eNodeB 511 and backhaul 521. Likewise, Downlink (DL) data between UE 501 and SGW 532 traverses source eNodeB 511 and backhaul 521.

Source eNode B 511 receives measurement reports from UE 501 indicating signal strength for source eNodeB 511 and neighbor eNodeBs that include target eNodeB 512. Source eNode B 511 typically determines when UE 501 has better signal strength from a neighbor eNodeB. Source eNode B 511 may use a handover threshold selected by backhaul 521 for load balancing. In this example, target eNodeB 512 provides signal strength that exceeds the handover threshold at UE 501, so source eNodeB 511 triggers an X2 handover for UE 501 to target eNodeB 512.

Source eNodeB 511 transfers an X2 handover request (RQ) over backhaul 521 to target eNodeB 512. The X2 handover request indicates UE bearer context and other information including the S1 tunnel for UE 501 between source eNodeB 511 and SGW 532. Target eNodeB 512 establishes an UL to SGW 532 and generates UE attachment data. Target eNodeB 512 transfers an X2 handover response (RP) over backhaul 521 to source eNodeB 511. The X2 handover response indicates the UE bearer context, X2 tunnel data, UE attachment data, and other information.

SGW transfers DL data to backhaul 521. Instead of transferring the DL data in a loop through source eNodeB 511, backhaul 521 transfers the DL data from SGW 532 to target eNodeB 512. Backhaul 521 couples the DL tunnel from SGW 532 to source eNodeB 511 to the X2 tunnel from source eNodeB 511 to target eNodeB 512. Target eNodeB 512 buffers the DL data. Backhaul 521 maintains sequence numbers to track the handover point in the DL data flow. Backhaul 521 also sends a reconfiguration request information to source eNodeB 511 for UE 501. Source eNodeB 511 transfers a reconfiguration request to UE 501 that indicates the UE attachment data for target eNodeB 512.

Referring to FIG. 8, UE 501 attaches to target eNodeB 512 using the UE attachment data. Target eNodeB 512 transfers the buffered DL data to UE 101. The UL between UE 501 and SGW 532 now traverses target eNodeB 112 and backhaul 521. Responsive to the UL data for UE 501 from target eNodeB 512, backhaul 521 transfers an S1 switch request to MME 531. The S1 switch request indicates the UE bearer, eNodeB tunnel data, and other information. MME 531 transfers a modify bearer request to SGW 532 and SGW 532 returns a modify bearer response to MME 152 (interactions with the Packet Data Network Gateway are omitted here for clarity).

S-GW 532 marks the handover point in the DL data flow to backhaul 521. Backhaul 521 stops forwarding data over the X2 tunnel to target eNodeB 512 at the handover marker. The DL data between SGW 532 and UE 501 now traverses backhaul 521 and target eNodeB 512. MME 531 transfers an S1 switch response to backhaul 521. Backhaul 521 transfers a UE context release (REL) to source eNodeB 511. Source eNodeB 511 clears UE 501 context and the handover is complete.

Advantageously, backhaul 521 eliminates the data loop through source eNodeB 511. Backhaul 521 also eliminates some messaging for sequence numbering and S1 switching.

FIGS. 9-10 illustrate the operation of LTE network 500 with intelligent backhaul 521 to offload S1 hand-over processing from source eNodeB 511 and target eNodeB 512. The S1 handover is typically used when an X2 handover is not available or fails. Initially, UL data between UE 501 and SGW 532 traverses source eNodeB 511 and backhaul 521. Likewise, Downlink (DL) data between UE 501 and SGW 532 traverses source eNodeB 511 and backhaul 521.

Source eNode B 511 receives measurement reports from UE 501 indicating signal strength for source eNodeB 511 and neighbor eNodeBs that include target eNodeB 512. Source eNode B 511 typically determines when UE 501 has better signal strength from a neighbor eNodeB. Source eNode B 511 may use a handover threshold selected by backhaul 521 for load balancing. In this example, target eNodeB 512 provides signal strength that exceeds the handover threshold at UE 501, so source eNodeB 511 triggers an S1 handover for UE 501 to target eNodeB 512.

Source eNodeB 511 transfers an S1 handover request (RQ) over backhaul 521 to MME 531. The S1 handover request indicates target eNodeB 512, eNodeB tunnel data, and other information. MME 531 transfers the S1 handover request to target eNodeB 512. Target eNodeB 512 returns an acknowledgement (ACK) to MME 531. The acknowledgement indicates UE attachment data and eNodeB tunnel data. MME 531 transfers an S1 handover command (CMD) to source eNodeB 511 over backhaul 521 that indicates the UE attachment data.

MME 531 transfers an indirect tunnel request to SGW 532, and SGW 532 returns an indirect tunnel response. The tunnel request indicates the indirect source and target eNodeB tunnels to connect. To avoid the data loop through source eNodeB 511, backhaul 521 couples the DL tunnel from SGW 532 (toward source eNodeB 511) to the indirect tunnel through SGW 532 to target eNodeB 512. The DL data between SGW 532 and UE 501 now traverses backhaul 521 to the indirect tunnel through SGW 532 to target eNodeB 512. Target eNodeB 512 buffers the DL data.

Referring to FIG. 10, source eNodeB 511 transfers a reconfiguration request to UE 501 that indicates the UE attachment data for target eNodeB 512. In addition, source eNodeB 511 transfers sequence numbers to target eNodeB 512 over backhaul 521 and MME 531 that indicate the handover point in the DL data flow. UE 501 attaches to target eNodeB 512 using the UE attachment data. Target eNodeB 512 transfers the buffered DL data to UE 501. The UL data between UE 501 and SGW 532 now traverses target eNodeB 512.

Target eNodeB 512 transfers an S1 switch Notice (OK) to MME 531. MME 531 transfers a UE context release to source eNodeB 511 over backhaul 521. Source eNodeB 511 clears UE 501 context. MME 531 transfers an indirect tunnel delete (DEL) request to SGW 532. SGW 532 deletes the indirect tunnel and the handover is complete.

Advantageously, backhaul 521 eliminates the data loop through source eNodeB 511. Backhaul 521 also eliminates some messaging for the S1 handover requests.

Figure 11:
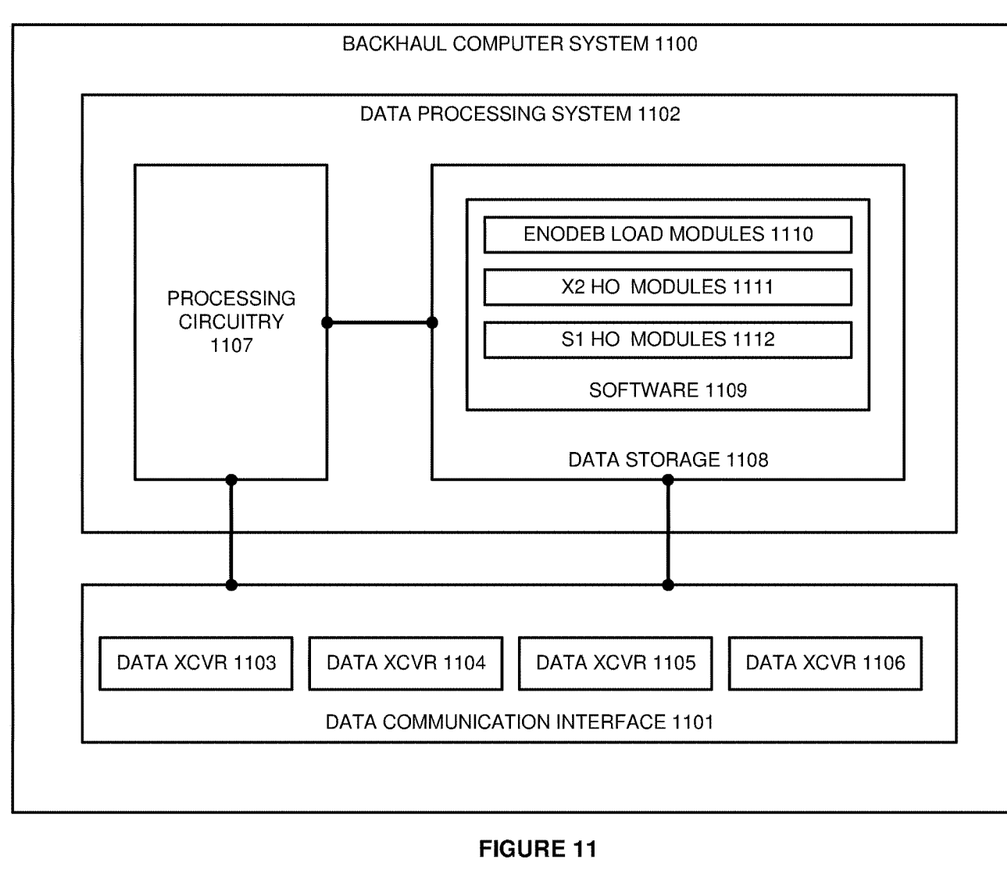
FIG. 11 illustrates a backhaul computer system to provide load balancing and handover processing to eNodeBs.

FIG. 11 illustrates a backhaul computer system 1100 to direct and offload handover processing for eNodeBs. Backhaul computer system 1100 is exemplary, and backhaul 521 may use different configurations and operations. Backhaul computer system 1100 comprises data communication interface 1101 and data processing system 1102. Data communication interface 1101 comprises data transceivers 1103-1106. Data processing system 1102 comprises processing circuitry 1107 and data storage system 1108. Data storage system 1108 stores software 1109. Software 1109 includes respective software modules 1110-1112.

Data transceivers 1103-1106 comprise communication components, such as ports, bus interfaces, signal processors, memory, software, interface cards, and the like. Processing circuitry 1107 comprises bus interfaces, CPUs, integrated circuitry, RAM, and associated electronics. Data storage system 1108 comprise non-transitory, machine-readable, data storage media, such as flash drives, disc drives, memory circuitry, and the like. Software 1109 comprises machine-readable instructions that control the operation of processing circuitry 1107 when executed. All or portions of software 1109 may be externally stored on one or more storage media, such as circuitry, discs, and the like. Some conventional aspects of NFVI computer system 1100 are omitted for clarity, such as power supplies, substrate, and other computer equipment.

When executed by processing circuitry 1107, software modules 1110-1112 direct processing circuitry 1107 to perform the following operations. eNodeB load modules 1110 control handover thresholds based on eNodeB loading. X2 handover modules 1111 assist eNodeBs with X2 handovers. S1 handover modules 1112 assist eNodeBs with S1 handovers.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless network backhaul node to serve eNodeBs, the method comprising:
   exchanging user data and network signaling between the eNodeBs and a Long Term Evolution (LTE) core;
   receiving loading information from the eNodeBs and determining overloaded ones of the eNodeBs and underloaded ones of the eNodeBs based on the loading information;
   selecting handover thresholds for the eNodeBs to inhibit handovers from the underloaded ones of the eNodeBs to the overloaded ones of the eNodeBs and to encourage handovers from the overloaded ones of the eNodeBs to the underloaded ones of the eNodeBs wherein the selected handover thresholds comprise signal strength differences between source and target ones of the eNodeBs;
   transferring the selected handover thresholds to the eNodeBs; and
   performing handover assistance for the eNodeBs.

2. The method of claim 1 wherein performing the handover assistance for the eNodeBs comprises performing X2 handover assistance for the eNodeBs.

3. The method of claim 1 wherein performing the handover assistance for the eNodeBs comprises performing S1 handover assistance for the eNodeBs.

4. The method of claim 1 wherein performing the handover assistance for the eNodeBs comprises coupling source downlink tunnels from a serving gateway to a target downlink tunnels to the target ones of the eNodeBs without downlink tunneling through the source ones of the eNodeBs.

5. The method of claim 4 further comprising detecting a handover markers in the source downlink tunnels and de-coupling the source downlink tunnels from the target downlink tunnels.

6. The method of claim 1 wherein performing the handover assistance for the eNodeBs comprises coupling a source downlink tunnels to indirect tunnels through a serving gateway to the target ones of the eNodeBs without downlink tunneling through the source ones of the eNodeBs.

7. The method of claim 1 wherein performing the handover assistance for the eNodeBs comprises transferring a reconfiguration request to the source ones of the eNodeBs.

8. The method of claim 1 further comprising storing sequence numbering indicating a handover point in a downlink data flow.

9. The method of claim 1 wherein the wireless network backhaul node comprises one of a data switch, data router, and Network Function Virtualization (NFV) Virtual Network Function (VNF).

10. A wireless network backhaul node to serve eNodeBs comprising:
    data transceivers configured to exchange user data and network signaling between the eNodeBs and a Long Term Evolution (LTE) core, receive loading information from the eNodeBs, and transfer selected handover thresholds to the eNodeBs;
    a data processing system configured to determine overloaded ones of the eNodeBs and underloaded ones of the eNodeBs based on the loading information, select the handover thresholds for the eNodeBs to inhibit handovers from the underloaded ones of the eNodeBs to the overloaded ones of the eNodeBs and to encourage handovers from the overloaded ones of the eNodeBs to the underloaded ones of the eNodeBs wherein the selected handover thresholds comprise signal strength differences between source and target ones of the eNodeBs; and
    the data processing system configured to perform handover assistance for the eNodeBs.

11. The wireless network backhaul node of claim 10 wherein the processing system is configured to perform X2 handover assistance for the eNodeBs.

12. The wireless network backhaul node of claim 10 wherein the processing system is configured to perform S1 handover assistance for the eNodeBs.

13. The wireless network backhaul node of claim 10 wherein the processing system is configured to couple source downlink tunnels from a serving gateway to target downlink tunnels to the target ones of the eNodeBs without downlink tunneling through the source ones of the eNodeBs.

14. The wireless network backhaul node of claim 13 wherein the processing system is configured to detect handover markers in the source downlink tunnels and de-couple the source downlink tunnels from the target downlink tunnels.

15. The wireless network backhaul node of claim 10 wherein the processing system is configured to couple a source downlink tunnels to indirect tunnels through a serving gateway to the target ones of the eNodeBs without downlink tunneling through the source ones of the eNodeBs.

16. The wireless network backhaul node of claim 10 wherein the processing system is configured to transfer a reconfiguration request to the source ones of the eNodeBs.

17. The wireless network backhaul node of claim 10 wherein the processing system is configured to store sequence numbering indicating a handover point in a downlink data flow.

18. The wireless network backhaul node of claim 10 wherein the wireless network backhaul node comprises one of a data switch, data router, and Network Function Virtualization (NFV) Virtual Network Function (VNF).

* * * * *